United States Patent
Willner et al.

(10) Patent No.: US 6,827,045 B1
(45) Date of Patent: Dec. 7, 2004

(54) LEASH WITH FRICTIONALLY RESISTANT SLIDABLY MOUNTED GRIP

(76) Inventors: Sherrill Willner, 3300 Rice St., Coconut Grove, FL (US) 33133; Jeffrey Willner, 3300 Rice St., Coconut Grove, FL (US) 33133

(*) Notice: Subject to any disclaimer, the term of this patent is extended or adjusted under 35 U.S.C. 154(b) by 0 days.

(21) Appl. No.: 10/679,591

(22) Filed: Oct. 6, 2003

(51) Int. Cl.[7] .................................................. A01K 27/00
(52) U.S. Cl. .................................................... 119/795
(58) Field of Search .......................... 119/770, 795, 119/797, 798; 294/153

(56) References Cited

U.S. PATENT DOCUMENTS

| | | | | |
|---|---|---|---|---|
| 5,443,038 A | * | 8/1995 | Marino | 119/784 |
| 5,732,663 A | * | 3/1998 | Manzella | 119/798 |
| 5,971,458 A | * | 10/1999 | Contreras et al. | 294/150 |
| 6,460,488 B1 | * | 10/2002 | Manzella et al. | 119/798 |

FOREIGN PATENT DOCUMENTS

DE     3939981 C1 * 4/1991 ........... A01K/27/00

* cited by examiner

Primary Examiner—Robert P. Swiatek
(74) Attorney, Agent, or Firm—Notaro & Michalos PC.

(57) ABSTRACT

A leash has an elongated line, a first grip handle made of resilient material and connected to one end of the line and a second grip made of resilient material and frictionally engaged around the line at any intermediate location along the line. The frictional engagement between the second grip and the line is sufficient to preclude involuntarily sliding or movement of the grip along the leash line when an animal is being restrained or controlled. However, the user's voluntary exertion of force can be used to overcome the frictional engagement so that the second grip can be slid along the line for adjustment. The leash has a durable construction and displays a variety of colors, patterns, prints or designs.

19 Claims, 4 Drawing Sheets

LEASH WITH FRICTIONALLY RESISTANT SLIDABLY MOUNTED GRIP

FIELD AND BACKGROUND OF THE INVENTION

The present invention relates generally to a leash and in particular to a leash having a stationary first handle and a movable second handle mounted on the line of the leash and frictionally resistive to the material of the line so that the second handle is stationary without user intervention and does not involuntarily slide when an animal is being restrained or controlled.

A leash for restraining or tethering an animal such as a dog typically includes an elongated strap having a handle at one end and a clasp at the other end. The clasp is attached to the animal's collar. The user of the leash holds the handle in order to control the animal attached to the leash clasp at the other end of the leash.

U.S. Pat. No. 5,732,662 to Jacobsen discloses an animal leash which includes an inelastic handle in the form of a loop, an elastic lead, and a clip or equivalent attachment device at the end of the lead for attaching the lead to an animal. A tubular foam member is provided with an axially disposed passage to slide over the grip portion of the handle loop.

U.S. Patent Des. 424,762 to Nasser illustrates a dog leash with a clasp at one end and a looped handle at the other end, wherein the grip portion of the handle is surrounded by a cylindrical foam member.

U.S. Patent Des. 374,518 to McIntyre illustrates a dog lead with a clasp at one end of the lead and a looped handle with a round grip member resting on the grip portion of the handle.

U.S. Pat. No. 3,096,741 to Ollstein illustrates a flat leash strap formed from three braided cords.

U.S. Patent Des. 421,669 to Mochring shows a woven animal restraint strap with material arranged in different layers of diagonal and overlapping geometric pattern.

Additionally, several patents have addressed the need for a second handle to assist in control of the animal, particularly in the case of larger or stronger animals. Some patents have suggested a sliding member as a second handle.

U.S. Pat. No. 6,453,851 to Holt, et al. discloses a leash strap with a loop handle at one end, a clip for attachment to an animal collar at the other end, and a slidable resilient or flexible gripping member slidably received on the leash, to provide the user with a second grip area with which to maintain control over an animal's movements. The loop handle is formed by the leash strap end being folded back onto itself and affixed in place. The grip member is slidably received on the leash strap due to a slot or passage which extends along the length of the member.

The dimensions of the slot are such that, moved along the length of the leash strap, the grip member will maintain its last established position in the lead. The gripping member has depressions or areas of thickness that are thinner than the thickness of the rest of the member so that when the gripping member is gripped at the thinner area, the gripping member engages the leash to control the animal attached to the leash.

Although the Holt patent teaches a leash with a slidable grip member received on the leash strap, the grip member is freely slidable. A user must exert force to prevent the grip member from sliding while attempting to keep the animal restrained. The leash requires that the user exert force in the gripping of particular areas of thickness of the gripping member to engage the gripping member against the leash so that the user does not lose control of the gripping member.

U.S. Pat. No. 6,006,699 to Keever discloses a flexible rope leash with a loop shaped handle at one end, a clasp for attachment to an animal collar at the opposite end, and a baton with a hollow interior that encircles the rope leash. The loop handle is formed by the leash strap end being folded back onto itself and affixed in place. The baton has ends with end caps that have openings through which the leash is received. The baton can therefore slide along the leash. Once figure of the Keever patent shows a handler pulling the leash with his right hand toward himself, and pushing the bottom with his left hand toward a dog attached to the leash.

Like the Holt patent, the baton is freely slidably and therefore the user must counteract the sliding capability of the baton while maintaining control of the dog.

U.S. Pat. No. 1,509,781 to Roth discloses a leash made of leather or other suitable material with a large loop at one end formed by folding the leash strap back upon itself. At the opposite end, the leash strap also folds back upon itself, but is attached to the portion of the strap it is folded against so that the leash is one uniform strap at that end. A small loop is also formed to accommodate a clip. A sliding member can be slid over the leash. The sliding member can be used to contract the large loop of the leash. The sliding member is preferably made of the same material as the leash. Roth '781 does not suggest using the sliding member as a second handle. Furthermore, the sliding member is freely slidable.

Also, a variety of patents teach second handles which are not freely slidable, but do not provide any flexibility to the user in spontaneously adjusting the handle while an animal is being controlled.

U.S. Pat. No. 6,223,694 to Rubin discloses an animal leash with a loop handle at one end and a clip for attachment to an animal collar at the other end, and two separate gripping handles fixed at various positions along the leash. The leash is preferably flat and made of nylon or leather, but may also be a round, rope-like leash. The loop handle is formed by the leash strap end being folded back onto itself and affixed in place. Both gripping handles can be made from soft partially compliant materials such as rubber for improved user comfort. Both gripping handles have a lengthwise aperture which can be round to accept a rope-like leash.

Although either of the gripping handles can be slidably adjusted toward the center of the leash and fixed in place with the assistance of a releaseable friction device, the gripping handles are intended to be set at a fixed position when the leash is being used. The releasable friction device prevents the second handle from movement once an adjustment is made. That is, the grip member is not always freely moveable. Therefore, the user does not have to exert additional force in counteracting a freely slidable second handle, but does not have the advantage of freely moving or sliding the second handle when the leash is in use.

U.S. Pat. No. 5,813,368 to Rasmussen discloses a hand held dog restraint comprises upper and lower restraint bars which are pivotally secured to each other, a dog collar attachment clip at the lower end, a wrist loop assembly through which a user's wrist can be placed, and a padded grip that is adhesively attached to the upper restraint bar. The padded grip is therefore fixed and not slidable.

A variety of patents also generally disclose leashes with multiple handles or grips.

U.S. Pat. No. 5,649,504 to Culp discloses a long lead and short leash combination. A first lead is releasably connected to a second lead at a position intermediate of the length of the second lead. The second lead has a connector at its free end for connecting to a collar of a dog. Therefore, the second lead is closer to the free end than the first lead. Both leads have a handle in the form of a loop which has foam for comfort. The first lead, or distant lead, can be used to provide freedom for a dog on the leash while the second lead, or close control lead can be used to restrain the dog.

U.S. Pat. No. 5,732,661 to Lagro teaches a leash comprising an elongated strap having a clasping device at one end and a closed loop at the other end. A gripping component is provided at an intermediate point between the two ends. The upper side of the gripping component is smooth and the lower side is characterized by the presence of a plurality of ridges and grooves amenable to receipt of the fingers of a person's hand. A person can hold the leash at the loop end and quickly and effectively restrain an animal by grasping the gripper component with their other hand. The gripper component is not slidable or moveable.

U.S. Pat. No. 5,749,326 to Jones et al. teaches a leash comprising a length of hollow braided material and elongated elastic members inside the material, a clasping device at one end of the length of the material for attachment of the leash to an animal, a fixed looped handle near the leash user and a fixed looped handle on the opposite side near the animal.

U.S. Patent Des. 454,670 to Weller illustrates a leash with a clasp at one end and a loop handle at the opposite end. Another loop handle is shown near the clasp end. A third loop handle is shown at an intermediate position between the two ends.

U.S. Patent Des. 388,558 to Miller shows a two-segment leash in which the first segment includes a clasp at one end and a loop handle at the other end. The loop handle connects the first segment of the leash to a second segment which has another loop handle at an end opposite the first segment.

U.S. Pat. No. 3,332,398 to Mintz teaches a leash in which a loop handle and ring are provided at one end and a loop handle and clasp are provided at the other end. The clasp is attached to a dog collar and the ring at the opposite end of the leash is attached to the clasp so that both ends of the leash are connected to the dog collar.

There is a need for a leash having a movable second handle which has some frictional resistance to free movement so that the handle does not involuntary slide while a user attempts to keep an animal restrained. At the same time, there is a need to maintain the benefit of an adjustable handle for users of various arm length and height, or for users wishing to gain leverage over the restrained animal.

SUMMARY OF THE INVENTION

It is an object of the present invention to provide a leash with a plurality of handles.

It is another object of the present invention to provide a leash with at least one slidably mounted handle on the leash line wherein there is sufficient friction between the handle and the line so that the handle does not involuntarily slide when the leash is pulled by an animal, but can be slidably adjusted by the exertion of the user's own voluntary force. The handle can therefore be adjusted based on a user's arm length, or to change a user's leverage over an animal on the leash.

It is yet another object of the present invention to provide a leash that is decorative and durable.

Accordingly, a leash is provided comprising an elongated line having first and second ends, attachment means connected to the second end for connecting the line to an animal, a first grip handle made of resilient material and connected to the first end of the line and a second grip made of resilient material and frictionally engaged around the line at any intermediate location between the first and second ends of the line. The frictional engagement between the second grip and the line is sufficient to preclude involuntarily sliding or movement of the grip along the leash line when an animal is being restrained or controlled. However, the second grip can be slid along the line for adjustment of the grip by the user's voluntary exertion of force to overcome the frictional resistance of the second grip.

The leash line is preferably constructed with tightly woven and braided polyester strands. The leash line may also have an outer tubular layer of flexible sheet material which displays a variety of colors, patters, prints, or designs while an inner core provides strength and firmness to the leash line.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
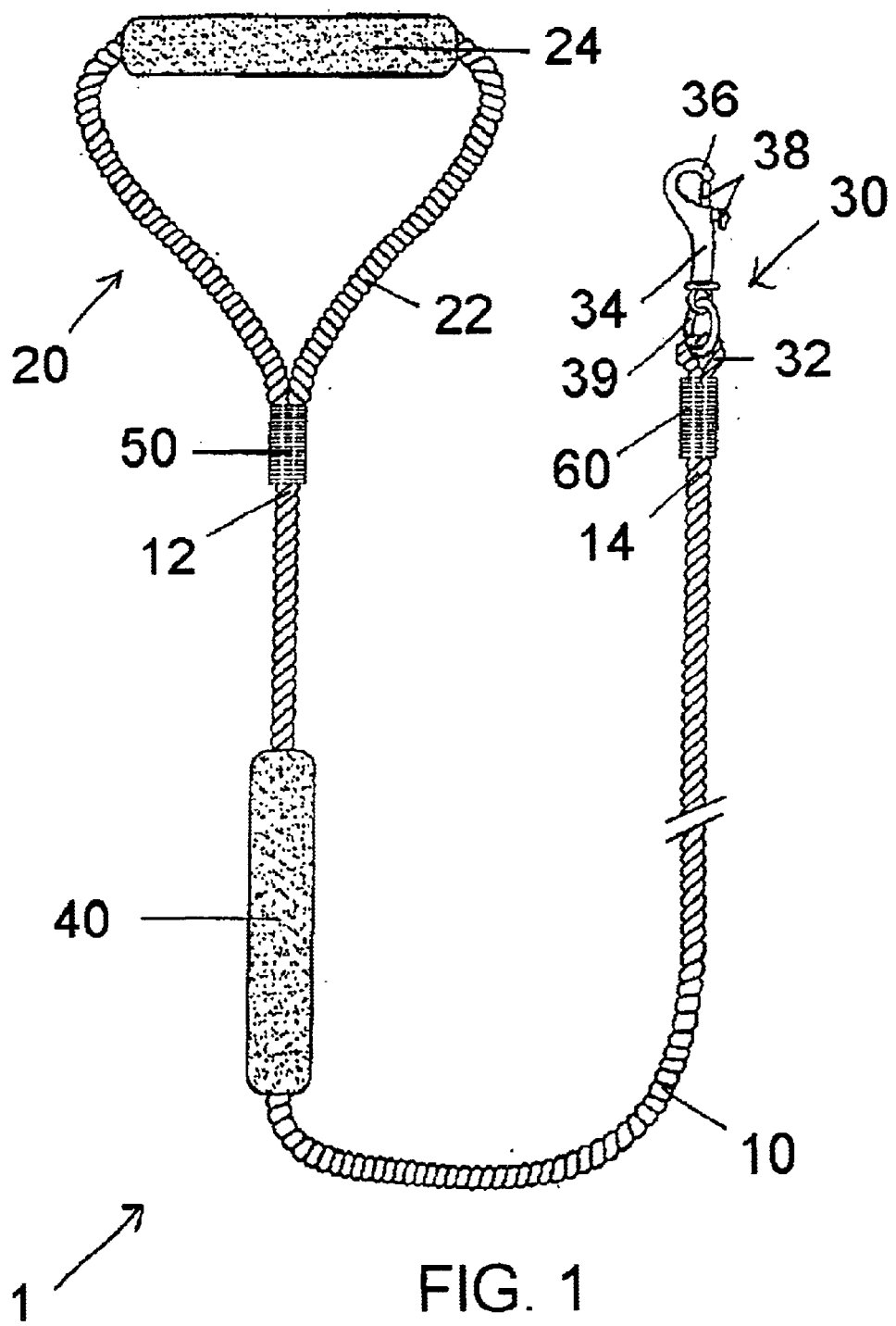
FIG. 1 is a front view of the leash.
Figure 2:
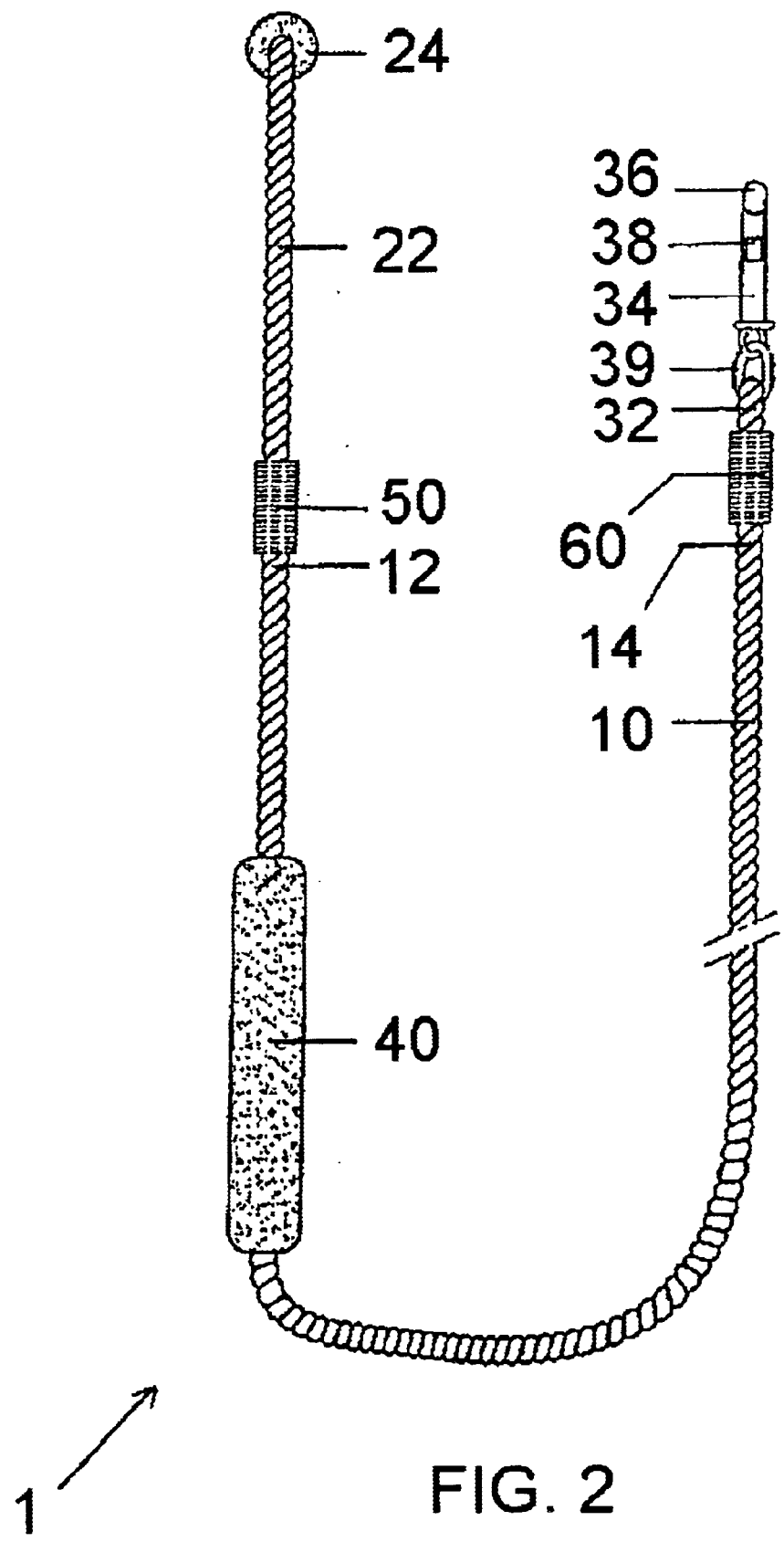
FIG. 2 is a side view of the leash.

Referring now to the drawings, in which like reference numerals are used to refer to the same or similar elements, FIGS. 1 and 2 show a leash, generally designated 1, comprising an elongated line 10 with a first end 12 and an opposite second end 14, a first handle, generally designated 20, connected to the first end 12, a second grip 40 slidably mounted on the line 10, and an attachment means, generally designated 30, connected to the second end 14.

The first handle 20 comprises a first cylindrical grip 24 that is oriented on an axis that is transverse to the axis of the line 10 and a loop 22 which connects the first grip 24 to the first end 12. The loop 22 is formed from an extension of the line 10 at first end 12, where the line extension is folded onto itself and joined at first end 12, forming a first joint connection. A first clamp means 50 secures the first joint connection.

The first grip 24 is cylindrical and includes a lengthwise round central passage through which it is slidably mounted onto the loop 22. The second grip 40 also contains a lengthwise central-passage through which it is slidably mounted onto the line 10. The second grip 40 serves as a second handle. Moreover, second grip 40 is situated so that the inner walls of the central passage are in frictional contact with the outer surface of line 10. Line 10 is preferably substantially cylindrical to maximize this frictional contact. It is not essential that first grip 24 be mounted in frictional engagement with loop 22 because first grip 24 is transverse to the line 10 and therefore, is not likely to slide when held, although frictional engagement between the first grip 24 and the loop 22 keeps the first handle in its transverse position.

Figure 3:
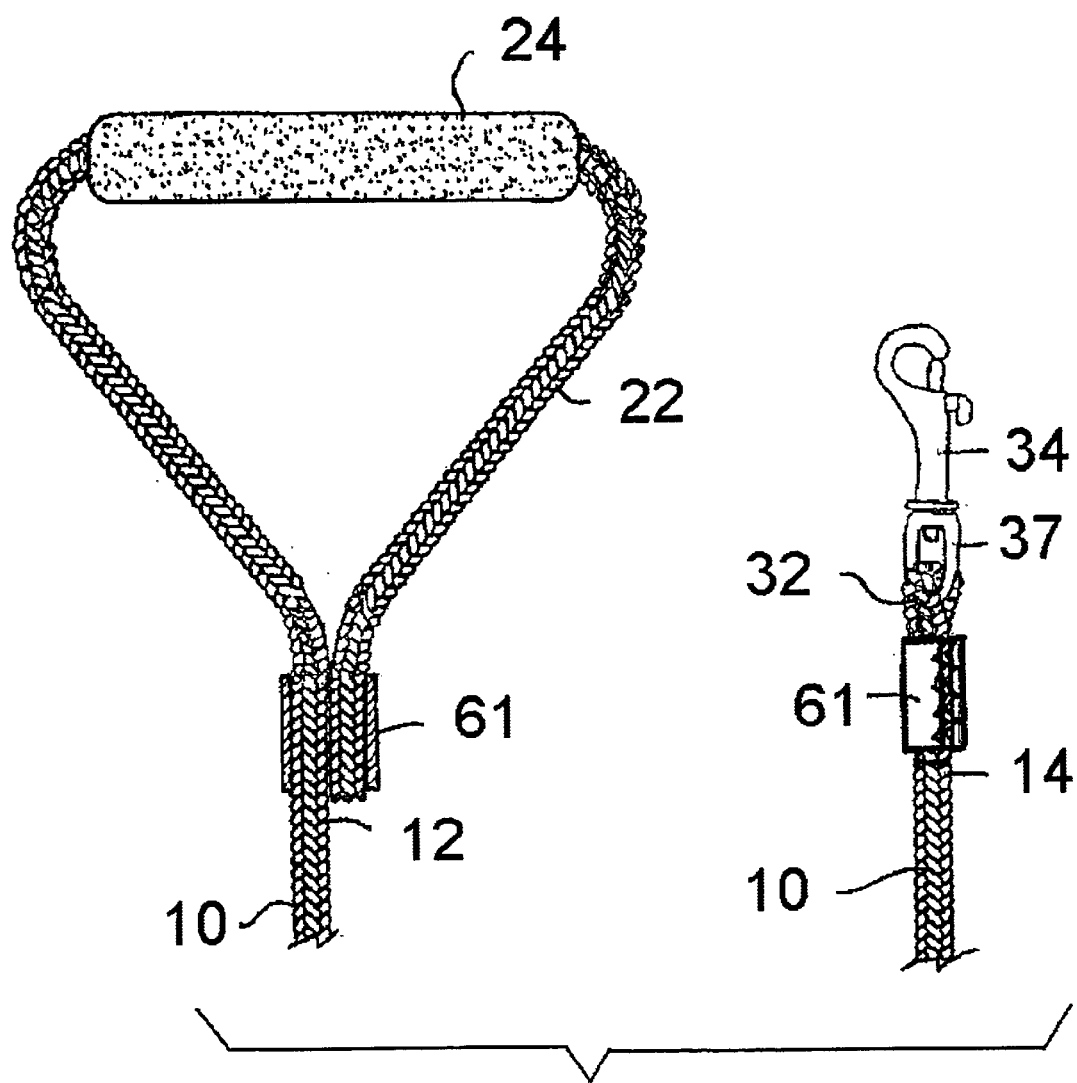
FIG. 3 is a partial front view of another embodiment of the leash.

The attachment means 30 comprises a ring 39 attached to a clasp 34, which is connected to a small second loop 32. The loop 32 is formed from an extension of the line 10 at second end 14, where the line extension is folded onto itself and joined at second end 14 forming a second joint connection. A second clamp means 60 secures the second joint connection. An alternate clasp is illustrated in FIGS. 3 and 4.

In regard to other novel and useful characteristics of the invention, the leash 1 preferably has an unusually durable construction. The leash line 10 can be a strap, rope, or similar article, although it is preferable cylindrical as noted above. The leash line 10 and loops 22 and 32 are preferably constructed of individually braided polyester strands which are twisted together in different patterns such as spiral patterns, for example, shown in FIGS. 1 and 2, on a braided pattern of FIG. 3. An inner core, if needed to compensate for insufficient strength of the outer braid, may be provided in the form of braided nylon or the outer braid or twisted rope (FIG. 1) may be nylon as well, for strength.

Figure 4:
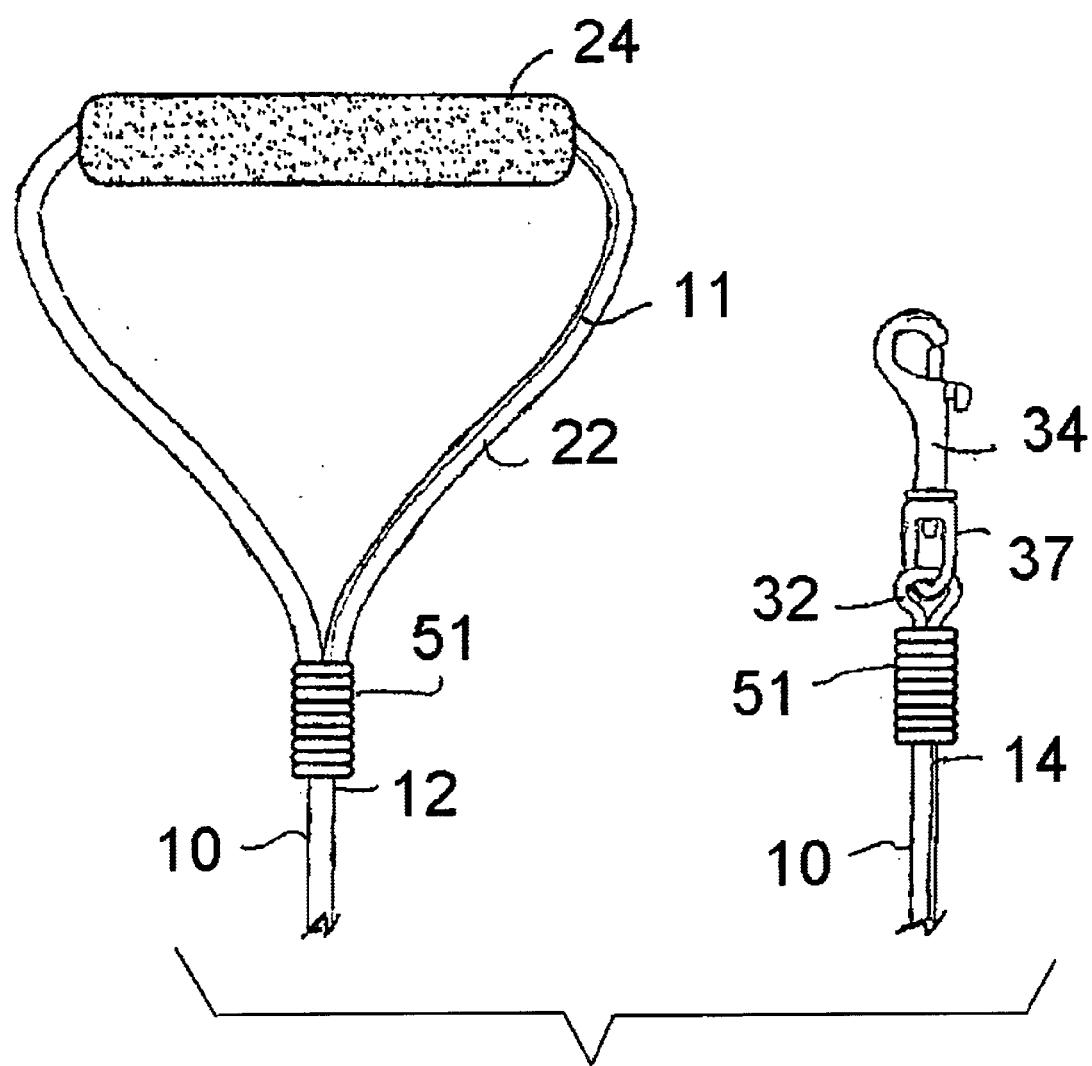
FIG. 4 is a view similar to FIG. 3 of a still further embodiment of the leash.

Alternatively, as shown in FIG. 4, the substantially cylindrical leash line 10 and loops 22 and 32 can be constructed of an inner core layer and an outer tubular layer. The inner core layer can be a multistranded filler in the form of individually braided polyester strands which are twisted together in different patterns, or, if needed to compensate for insufficient strength of the outer covering, may be braided nylon. The outer layer is a tube of flexible sheet material formed from braided tightly woven polypropylene or polyester strands. The outer layer braided strands provide a basic frame while the inner core adds strength and firmness.

The outer layer or sheath of the leash line 10 and loops 22 and 32 may also be flexible sheet material made from a smooth polyurethane material rather than a braided fabric. This is shown in FIG. 4, which illustrates a longitudinal seam 11 along the line 10 for closing the sheath. The outer layer and inner core may also be made from other industrial synthetic fibers such as polyethylene, nylon, polyvinyl chloride and leather, or from strong natural fibers such as such as hemp, manila, sisal, and cotton. However, the inner core should remain braided for strength and support.

The first and second grips 24 and 40 are preferably made from a spongy resilient high density foam material, which provides a compressible cushion for the user holding the grip. However, other soft and resilient materials may be used such as soft rubbers and elastomers. For example, the first and second grips 24 and 40 may alternatively be made of Neoprene rubber. The second grip in particular must be made of a material with a sufficient coefficient of static friction requiring a user to exert force to move the grip so as to overcome the frictional engagement between the inner walls of the grip central passage and the outer surface of the line or loop that is inserted into the central passage of the grip.

The first and second clamp means 50 and 60 at the first and second joint connections are preferably made by melting and gluing of the joint connection with a band of decorative cord 51 coiled and wrapped around the joint connection, as shown in FIG. 4. For additional strength, a metal tube 61 or band may be fitted over the joint connection, as shown in FIG. 3, and then covered with the braided decorative cord 51. Metal tube 61 is initially flat with straight or teethed (FIG. 3) edges, and is then bent into a substantial cylinder, over the adjacent ends of each loop, with the edges next to each other, to firmly fix the ends of the loops to each other and make sure that the loops stay closed. The braided decorative cord is preferably made from coils of string, but may also be made from coils of other types of strands such as rope or flat ribbon. The coils are also preferably made from polypropylene, but may also be made from industrial synthetic fibers such as polyethylene, polyester, polyurethane, nylon, polyvinyl chloride, and leather. The coils may also be made from natural fibers such as hemp, manila, sisal, and cotton.

The clasp 34 and ring 39 are preferably made from nickel but may alternatively be produced from other suitable metals such as silver, gold, brass, and copper. For cost efficiency, the clasp 34 can be alternatively produced from various plastics and polymers known by one skilled in the art as suitable for such a purpose. For example, some polymers or plastics may not have sufficient strength for holding a large dog and could easily break. Therefore, certain weak polymers and plastics may only be used on a leash for a smaller dog while stronger polymers and plastics should be used with leashes used for restraining and controlling larger dogs. In the embodiments of FIGS. 3 and 4, the clasp 34 has a swivel bail 37 pivotally connected to its inner end. Bail 37 has a loop that engages the loop 32 at the end 14 of line 10.

As shown in FIGS. 1 and 2, the clasp 34 preferably has a hook 36 and a latch 38 which can be moved longitudinally toward and away from the hook end to open and close the latch. A hidden spring is used to keep the latch 38 closed. Alternatively, the clasp 34 may be a lobster claw type, which includes a lobster claw-shaped hook and a spring-tensioned gate or arm that can be moved laterally toward and away from the claw end. Alternatively, the clasp can be any style, shape or size that is appropriate to the dimensions of the leash, and therefore, to the dog to be attached to the leash.

Another relevant characteristic of the invention is size. The dimensions of the various elements of the leash are generally not critical with one exception. The central passage of the second grip 40 must have a diameter equal to the diameter of the line 10 so that the inner walls of the passage are frictionally engaged against the outer surface of the line 10, preventing involuntary sliding of the second grip 40. The thickness of the tubular outer layer of the line 10 ranges between about 4 mm and 12 mm, and preferably between about 6 mm and 10 mm. The central passage of the second grip 40 therefore has a diameter ranging between about 4 mm and 12 mm, and preferably between about 6 mm and 10 mm. First grip 24 may have an equal diameter range or a larger diameter range.

As for various other components of the leash, the leash 1 has a length ranging between about 40 inches and 80 inches, and preferably between about 48 inches and 72 inches. Leash line 10 has a length ranging between about 32 inches and 76 inches, and preferably between about 36 inches and 72 inches. The length of the grips 24 and 40 ranges between about 3 inches and 6 inches, and preferably between about 4.5 inches and 5 inches. The diameter ranges will vary because users will have different hand sizes. The width of the entire grip 24 or 40 ranges between about 18 mm and 30 mm and preferably between about 20 mm and 25 mm.

The metal clasp ranges in length between about 45 mm and 90 mm long, and preferably between about 55 mm and 80 mm long, although other sizes and types can be used as would be apparent to those skilled in this art.

The loop 22 is preferably shaped as a triangle, having a first side extending toward the leash line 10 at an acute angle to the axis of the line 10, a second side extending at an acute angle to the first side, wherein the first grip 24 is slidably mounted or engaged around the second side, and a third side extending at an acute angle to the second side and to the axis of the line 10, wherein the third side has an end portion lying parallel to the line 10, and first clamp means 50 engaged around the joint connection of the end portion and line 10 adjacent the end portion for closing the loop 22. The first and third sides may be rounded to various degrees. Alternatively, the loop may be elongated and oval or the first and third sides may be short.

The leash 1 also has a variety of useful decorative characteristics. The leash line 10 and loops 22 and 32 preferably has a decorative color, pattern, print, or design. If the leash line 10 is braided, combinations of colors can be alternated in the twisting or braiding of strands of different color. The braiding of strands of different colors can also be used to formulate patterns such as animal prints. If a non-braided tubular body is used as the outer layer, it may also have a solid color, a variety of colors, or even a variety of patterns such as animal prints.

The decorative wrapping of clamp means 50 and 60 also preferably has colors, patterns, prints, or other similar designs. The colors, patterns, prints or designs may be similar to or may contrast the colors, patterns, prints, or designs of the outer layer of the line 10.

In use, a user of the leash 1 may hold onto the first handle via the first grip 24 with his left hand, and then hold onto the second grip 40 with his-right hand. The second grip 40 must be pushed or pulled by the user to adjust the positioning of the second grp 40. The second grip 40 may be adjusted along the length of the leash line 10 to either accommodate the user's arm length or the user's height.

The positioning of the second grip 40 may also be adjusted to add or reduce leverage to the user over the animal on the leash.

In one alternative embodiment of the invention, a plurality of extension lines with a ring at one end and a clasp at the other end may be attached to the leash 1 so that a plurality of dogs can be controlled at one time via manipulation of the leash 1. The extension line ring connects to the clasp 34 of leash 1. The extension line clasp is then attached to the animal's collar.

An extension line should be constructed in a similar fashion to the leash line 10, including a braided rope, or a braided inner core and a braided or smooth tubular outer layer. However, shorter extension lines may require less strength and therefore, may be constructed of one braided layer. An extension line may be of any suitable length or thickness, depending on the size of the animals that are to be controlled. The extension line may also be a variety of colors, patterns, prints, or designs that can be mixed and matched with the leash line 10.

In a second alternative embodiment of the invention, the first grip 24 may be frictionally engaged with the loop 22. Although it is not essential that the first grip 24 be mounted in frictional engagement with loop 22, there may be a variety of reasons for frictional engagement in alternative embodiments. Cost efficiency, for example, may alternatively require that first grip 24 and second grip 40 have the same dimensions and therefore the same frictional engagement with the material they are mounted on. Additionally, a loosely mounted first grip 24 may shift in position around loop 22 during storage and therefore may benefit from frictional engagement with the loop 22.

While specific embodiments of the invention have been shown and described in detail to illustrate the application of the principles of the invention, it will be understood that the invention may be embodied otherwise without departing from such principles.

What is claimed is:

1. An animal leash with enhanced control comprising:

an elongated line having a first end and a second end;

attachment means connected to the second end for connecting the line to an animal;

a first cylindrical grid handle made of resilient material and connected to the first end of the line so that an axis of the first cylindrical grip handle is substantially transverse to an axis of the line and adapted to be held by one hand of a person using the leash; and a second cylindrical grip handle made of resilient material and frictionally engaged around the line at a location intermediate the first and second ends of the line for engagement by said person's other hand using the leash, wherein the frictional engagement between the second cylindrical grip handle and the line is sufficient to preclude involuntary sliding of the second cylindrical grip handle along the line when an animal connected to the line is restrained, but may be overcome by said person's exertion of force to reposition the second grip handle on the line said first cylindrical grip handle being connected to the first end of the line via a first triangular loop at the first end of the line via a first triangular loop at the first end of the line, the triangular loop having a first side extending along the line and at an acute angle to the axis of the line, a second side extending at an acute angle to the first side, the first cylindrical grip handle being engaged around the second side, and a third side extending at an acute angle to the second side and to the axis of the line, the first side having an end portion lying parallel to the line, and first clamp means engaged around the end portion and the line adjacent the end portion for closing the first loop.

2. A leash according to claim 1, further comprising a second loop at the second end of the line, the second loop having an end portion lying against the line and second clamp means engaged around the end portion of the second loop and the line for closing the second loop, the attachment means being captured in the second loop.

3. A leash according to claim 2, wherein each of the first and second clamp means comprises a metal band around the end portion and line, and a decorative wrapping covering the metal band.

4. A leash according to claim 3, wherein the decorative wrapping comprises coils of string around the metal band.

5. A leash according to claim 3, wherein the decorative wrapping comprises coils of rope around the metal band.

6. A leash according to claim 3, wherein the decorative wrapping comprises coils of flat ribbon around the metal band.

7. A leash according to claim 2, wherein the attachment means comprises an metal latched hook having a bail portion captured in the second loop at the second end of the line.

8. A leash according to claim 1, wherein the attachment means comprises a metal latched hook connected to the second end of the line.

9. A leash according to claim 1, wherein the resilient material of the first and second grip handles is foam rubber.

10. A leash according to claim 1, wherein the resilient material of the first and second grip handles is neoprene rubber.

11. A leash according to claim 1, wherein the line is a braided rope.

12. A leash according to claim 11, wherein the line is made of a material from the group consisting of polypropylene, polyethylene, polyester, polyurethane, nylon, polyvinyl chloride, and leather.

13. A leash according to claim 1, wherein the line is a spiral braided rope.

14. A leash according to claim 1, wherein the line is rope covered by a tube of flexible sheet material.

15. A leash according to claim 14, wherein the tube of flexible sheet material is braided or smooth.

16. A leash according to claim 14, wherein the tube of flexible sheet material is fabric.

17. A leash according to claim 14, wherein the tube of flexible sheet material is made of a material from the group consisting of polyurethane, polypropylene, polyethylene, nylon, polyvinyl chloride and leather.

18. A leash according to claim 1, wherein the cylindrical.

19. A leash according to claim 1, wherein the line has an inner core and an outer covering and is substantially cylindrical.

* * * * *